UNITED STATES PATENT OFFICE.

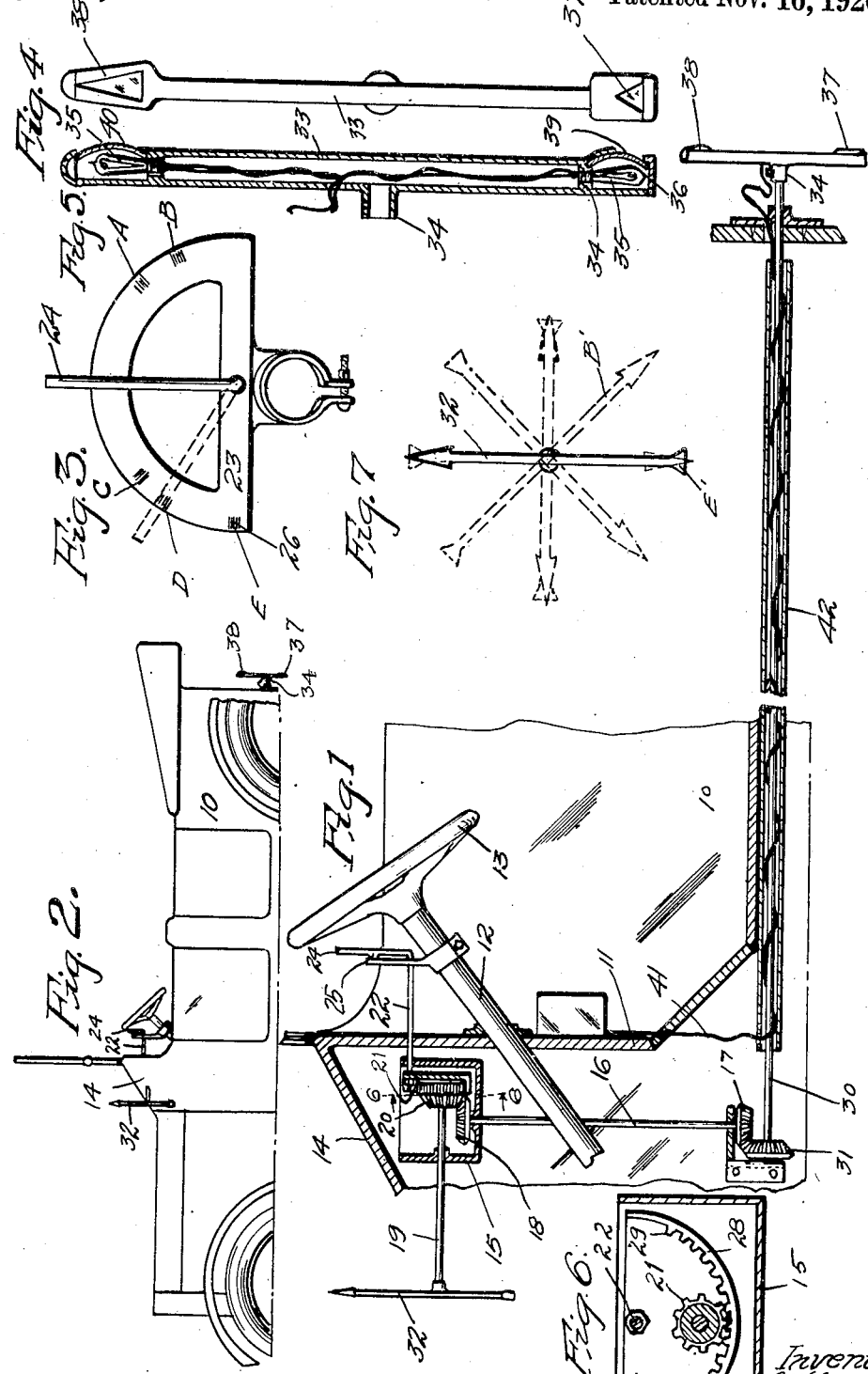

JOSEPH W. MICHAEL AND EARL L. MARTIN, OF WOODBURN, IOWA; SAID MARTIN ASSIGNOR TO SAID MICHAEL.

MOTOR SIGNAL DEVICE.

1,359,088.   Specification of Letters Patent.   Patented Nov. 16, 1920.

Application filed October 24, 1919. Serial No. 333,083.

*To all whom it may concern:*

Be it known that we, JOSEPH W. MICHAEL and EARL L. MARTIN, citizens of the United States, and residents of Woodburn, in the county of Clarke and State of Iowa, have invented a certain new and useful Motor Signal Device, of which the following is a specification.

The object of our invention is to provide a motor signal device of simple, durable and inexpensive construction, comprising indicator arms suitably mounted at the front and rear of the motor vehicle, and including suitable mechanism for controlling the indicator arms.

A further object is to provide such arms with suitably protected electric lights.

With these and other objects in view our invention consists in the construction, arrangement and combination of the various parts of the device, whereby the objects contemplated are attained, as hereinafter more fully set forth, pointed out in our claim and illustrated in the accompanying drawings, in which:

Figure 1 shows a sectional view through a portion of the body of an automobile equipped with a device embodying our invention.

Fig. 2 shows a side elevation of the same.

Fig. 3 shows an elevation of the controlling lever and indicating dial.

Fig. 4 shows an elevation of one of the indicator arms.

Fig. 5 shows a vertical, sectional view through the same.

Fig. 6 shows a sectional view taken on the line 6—6 of Fig. 1.

Fig. 7 shows an elevation of one of the indicator arms the dotted lines indicating the various positions thereof.

In the accompanying drawings I have used the reference numeral 10 to indicate generally the body of an automobile having the dash 11 and the steering post 12 on which is the wheel 13.

Located under the cowl 14 and preferably forwardly of the dash is a gear casing 15.

Suitably supported and extending downwardly through the gear casing from the interior thereof is an upright shaft 16 having beveled gears 17 and 19 on its ends.

Extending forwardly through the gear casing from the interior thereof is a horizontal shaft 19 having on its rear end a beveled gear 20 in mesh with the gear 18.

On the rear end of the shaft 19 just back of the beveled gear 20 is a pinion 21.

Extending rearwardly from the interior of the casing 15 through the wall thereof and through the dash 11 is a shaft 22 the rear end of which extends through the dial member 23.

On the rear end of the shaft 22 is a controlling lever 24 having a forwardly extending lug 25 adapted to coact with projections 26 arranged in suitable positions on the dial.

Fixed on the forward end of the shaft 22 is a half disk 27 having a forwardly extending peripheral flange 28 provided with internal gear teeth 29 which mesh with the pinion 21.

It will be seen that by swinging the lever 24 to different positions the disk member 27 will be rotated for imparting a rotation to the gear 21 and thereby rotating the shafts 19 and 16.

Suitably mounted is a horizontal shaft 30 having on its forward end a beveled gear 31 in mesh with a beveled gear 17. The shaft 30 extends rearwardly to the rear of the automobile.

On the forward end of the shaft 19 is an indicator arm, and on the rearward end of the shaft 30 is another indicator arm 32.

We have shown in our illustration two slightly different forms of indicating arms. The forward arm 32 is simply an arrow. The rearward arm comprises a tubular member 33 having a central laterally extending socket 34 secured to the shaft 30.

Near the ends of the tubular arm 33 are sockets 34 for electric light globes 35.

At the outer ends of the arm 33 are hinged cover members 36. The outer ends of the arm 33 have triangular portions 37 and 38 cut out and we have inserted transparent lenses 39 and 40 in position for covering such openings. The triangular opening 38 is smaller than the opening 37, as illustrated in Fig. 4, giving the appearance of an arrow when the lights are used.

Extending from the light circuit of the car are suitable flexible conducting means 41 which may be extended rearwardly through the casing 42 in which the shaft 30 is received, and thence through the wall of the arm 33 to the light globes 35.

For a better understanding of our invention it may be said that in the use of our device when the lever 24 is straight up the arrow or indicating arms will be vertical. By tilting the lever 24 to the right to position marked "A" the driver may operate the parts for turning the indicating arms until they point toward the right for indicating the intention of the driver to turn to the right.

By moving the lever 24 to the position marked "B" the indicating arms may be turned to the right and downwardly as indicated at B' in Fig. 7, for indicating the intention to turn around to the right. By turning the lever to the position marked "C" the indicating arms may be turned slightly to the left to indicate an intention to turn to the left. By moving the lever to the position marked "D" the indicating arms may be turned to the left and downwardly for indicating the intention to turn around. By moving the lever to the position marked "E" the indicating arms can be moved to position where they point downwardly as indicated by dotted lines at E' in Fig. 7 for showing the intention of the driver to stop.

The arm 33 may be illuminated at night when the automobile lights are on.

It will be understood that the gears are so arranged that the movements of the lever 24 hereinbefore referred to will force the operations of the indicating arms as hereinbefore described.

The use of the hinged cover members 36 permits access to the light globes 35 for removing and replacing them and also makes it possible to readily remove or replace the lenses 39 and 40.

The light globes 35 may be red if desired.

The lever 24 is of resilient material and is so mounted with relation to the dial that when the lug 25 engages the projections 26 the lever will be held in its various adjusted positions.

Some changes may be made in the construction and arrangement of the parts of our improved device without departing from the essential features and purposes of our invention, and it is our intention to cover by our claim any modified forms of structure or use of mechanical equivalents which may be reasonably included within its scope.

We claim as our invention:

A signal device, comprising a casing having front, rear and bottom walls, a signal device operating shaft mounted in the bottom wall, with a beveled gear thereon, a shaft mounted in the front wall having a beveled gear thereon meshing with said first beveled gear, a shaft mounted in said rear wall, having a segmental member thereon provided with a flange having internal gear teeth, and a gear on said second shaft meshing with said internal gear teeth, said last gear and said second described beveled gear being arranged in between said first described beveled gear and said segmental member, a signal on one of said shafts and a controlling device on another of said shafts.

Des Moines, Iowa, September 20, 1919.

JOSEPH W. MICHAEL.
EARL L. MARTIN.